J. D. GREEN.
Car Wheel.
No. 101,259.
Patented March 29, 1870.
Fig. 7
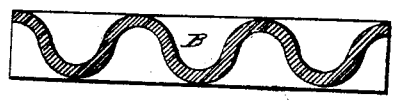
Fig. 6
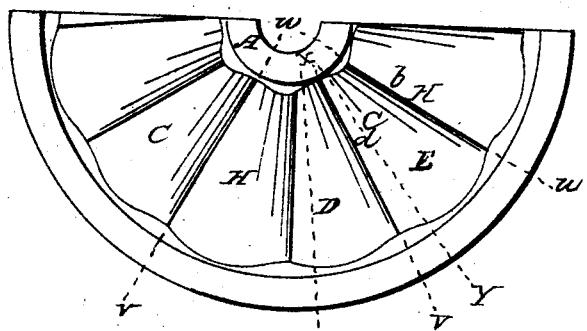
Fig. 1
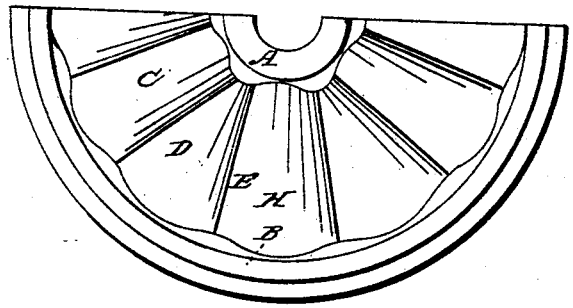
Fig. 2
Fig. 3
Fig. 4
Fig. 5
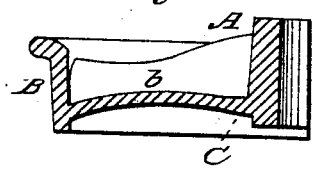
Witnesses:
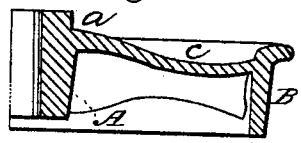
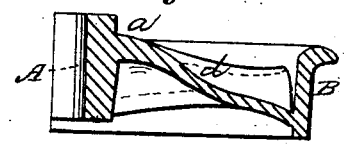
Inventor:
Jeremiah D Green

United States Patent Office.

JEREMIAH D. GREEN, OF TROY, NEW YORK.

Letters Patent No. 101,259, dated March 29, 1870.

IMPROVED WHEEL FOR RAILWAY CARS.

The Schedule referred to in these Letters Patent and making part of the same.

*To all whom it may concern:*

Be it known that I, JEREMIAH D. GREEN, of Troy, in the county of Rensselaer and State of New York, have invented a new and useful Improvement in Cast-iron Wheels for Railway Carriages; and I do hereby declare that the following is a full, clear, and exact description thereof, reference being had to the accompanying drawings and to the letters of reference marked thereon.

The object of my invention consists in the construction of a railway-car wheel that may be cast in one piece, with a solid hub and chilled rim or tread, united by a single plate or web, without liability to fracture or flaw in any of its parts from undue strain on the metal of the wheel, arising from unequal contraction thereof in cooling after casting; and also to so proportion the metal to the respective parts of said wheel as to thereby make a lighter and stronger wheel, one possessing much greater strength to resist vertical and lateral strains when in use than any heretofore made.

The nature of my said invention consists in the peculiar construction of the single plate or web uniting the rim and hub of the wheel, which plate has a series of radial corrugations extending around and occupying alternate positions on each side thereof, with two or more of the corrugations extending from the rim, uniting into one at or near to, and which then joins the hub; the said plate is also made in a peculiar curved or arched shape from the hub to the rim of the wheel; and that part of the corrugated plate extending alternately nearest to the ends of the hub is made much thicker where joining thereat than the other parts of said plate, substantially as and for the purpose hereinafter described and shown.

In the accompanying drawings—

Figure 1 is a view of the flange or back side of the wheel.

Figure 2, the front side thereof.

Figure 3 is a sectional view from hub to rim, taken at the dotted line $u\ w$ of fig. 1.

Figure 4 is a sectional view from hub to rim, taken at the dotted line $u\ y$ of fig. 1.

Figure 5 is a sectional view from hub to rim, taken at the dotted line $w\ v$ of fig. 1.

Figure 6 is a sectional view of the corrugated plate, taken near to and concentric with the hub; and Figure 7 is a sectional view of the corrugated plate, taken near to and concentric with the rim or tread of the wheel.

Figs. 1 and 2 show respectively the front and back side of one-half of my improved wheel, the other half thereof being constructed in precisely the same manner, and the hub A is united to the rim or tread B by the corrugated or grooved plate or web C, so that the hub, plate, and rim, composing the wheel, are cast solid together, and form a wheel having and showing the following distinguishing features of construction.

Two or more of the radial corrugations D and E extend from the rim B, uniting into one near to or at and then joining the hub A.

Arranged next to said united corrugations is a single corrugation, H, extending from the hub to the rim, the said united and single corrugations being respectively arranged in alternating succession around or throughout the whole plate C, substantially as shown in figs. 1 and 2.

These grooves or corrugations are more or less semi-circular in shape, and form a series of elevations and depressions, which are arranged around the plate so as to occupy alternate positions on each side thereof, substantially as shown in figs. 6 and 7, and so as to give firm support to the hub and rim against all lateral strains or shocks. The said corrugations, where joining thereto or thereon, are spread out or extended to nearly the whole length of the hub and width of the rim.

For plates of the ordinary-sized railway-car wheels, I make twelve grooves or corrugations at the rim, which are united near to and so as to form but six at the hub. A greater number of corrugations next the hub of the size and form to give proper strength thereto, would be impracticable in molding and casting the wheel, on account of breaking the mold in drawing the pattern therefrom, or by "washing" the mold in casting.

To give the necessarily great strength and stiffness required in the plate to withstand lateral strains at and near the hub, which parts are exposed to the greatest strain when in use, I make that part of the corrugation which extends the nearest to the ends of the hub much thicker at and where joining the hub than the rest of the plate, in manner as shown at $a$, in figs. 3, 4, 5, and 6 of the drawings, and so as to taper into the usual thickness of the rest of the plate, as shown. This also greatly facilitates the molding and casting of the wheel, by shortening the depth of the grooves or corrugations, so that the mold is not broken in drawing the pattern therefrom, nor "washed" in casting the wheel.

The face sides of the plate, from the hub to the rim, are formed in curves, in manner substantially as shown at $b$ and $c$ in figs. 3 and 4, and at $d$ in fig. 5, which extend from hub to rim, and are arranged in the following order or succession: first, the curve $b$ on line $u\ w$, figs. 1 and 3; next, the curve $c$ on line $u\ y$, figs. 1 and 4; and next, the curve $d$ on line $u\ v$, figs. 1 and 5, and in the same order of arrangement around the plate, and in alternate positions on each side thereof. This peculiar corrugated and curved construction of the plate gives greater strength to the whole wheel, and much better support to the hub and rim to resist lateral and direct or vertical strains when in use, and with less metal than heretofore used in car-wheels; and also this peculiar form of plate gives it the greatest facilities to yield in all directions by the flattening of the curves thereof, so as to compensate for the unequal contraction of the metal of the several parts of the wheel in cooling after being cast, so that a wheel is made free from fractures or flaws, and with a solid hub.

It also obviates the expense of ring cores in molding, and the consequent liability of wheels in casting being chilled in the plate or web, or "honey-combed," by wet or damp cores, or the want of proper vent for escape of the gases from cores.

I claim—

1. Uniting two or more of the radial corrugations D and E, extending from the rim B, so as to join the hub A as one, substantially as and for the purpose described.

2. The combination of said united corrugations D and E, extending from the rim B, with the single corrugations H, extending from hub A to rim B, substantially as and for the purpose described.

3. The combination of the said single and united corrugations H and D E with the curves b, c, and d, of the plate C, substantially as and for the purpose described.

4. In a car-wheel, constructed as described, having the corrugations D E and H, making that part of the corrugated plate joining the hub A, near its ends, of greater thickness than its other parts, and gradually decreasing or tapering it into the thickness of the other parts of the plate, substantially as shown and for the purpose described.

JEREMIAH D. GREEN.

Witnesses:
H. I. ALVORD,
WM. KESLER.